(12) United States Patent
Johnsen et al.

(10) Patent No.: US 10,468,925 B2
(45) Date of Patent: Nov. 5, 2019

(54) ROTOR INCLUDING SEGMENTED YOKE

(71) Applicant: Rolls-Royce Marine AS, Aalesund (NO)

(72) Inventors: Gunnar Johnsen, Ulsteinvik (NO); Charles Skar, Ulsteinvik (NO)

(73) Assignee: Rolls-Royce Marine AS, Aalesund (NO)

( * ) Notice: Subject to any disclaimer, the term of this patent is extended or adjusted under 35 U.S.C. 154(b) by 55 days.

(21) Appl. No.: 14/386,379

(22) PCT Filed: Mar. 22, 2013

(86) PCT No.: PCT/NO2013/050059
§ 371 (c)(1),
(2) Date: Sep. 19, 2014

(87) PCT Pub. No.: WO2013/147615
PCT Pub. Date: Oct. 3, 2013

(65) Prior Publication Data
US 2015/0048701 A1    Feb. 19, 2015

(30) Foreign Application Priority Data
Mar. 26, 2012 (NO) .................................. 20120365

(51) Int. Cl.
*H02K 1/04*  (2006.01)
*H02K 1/27*  (2006.01)
*H02K 15/03* (2006.01)

(52) U.S. Cl.
CPC ............... *H02K 1/27* (2013.01); *H02K 1/04* (2013.01); *H02K 1/278* (2013.01); *H02K 1/2786* (2013.01); *H02K 15/03* (2013.01); *H02K 2213/12* (2013.01)

(58) Field of Classification Search
CPC ........... H02K 1/04; H02K 1/27; H02K 1/278; H02K 1/2786; H02K 15/03; H02K 2213/12
USPC ........ 310/156.12, 156.23, 216.008, 216.061; 290/44, 55
See application file for complete search history.

(56) References Cited

U.S. PATENT DOCUMENTS 7,030,530 B2 *  4/2006  Malmberg ............ H01F 7/0221
                                              310/154.01
7,781,932 B2 *  8/2010  Jansen ................... H02K 1/278
                                              310/156.08
8,084,910 B2 * 12/2011  Silander ................ H02K 1/276
                                              310/156.03

(Continued)

FOREIGN PATENT DOCUMENTS

JP    2010136514 A    6/2010
JP    2011135735 A    7/2011

OTHER PUBLICATIONS

International Search Report and Written Opinion dated Aug. 27, 2013 (PCT/NO2013/050059).

(Continued)

*Primary Examiner* — John K Kim
(74) *Attorney, Agent, or Firm* — Alix, Yale & Ristas, LLP

(57) ABSTRACT

Rotor for motor or generator, which rotor (11) includes a rotor ring (12), which rotor includes a yoke formed by yoke segments (13) which by arrangement to the rotor ring (12) forms a complete yoke. The yoke segments (13) are provided with one or more magnet blanks (19), which magnet blanks (19) are formed by one or more permanent magnets (18).

19 Claims, 7 Drawing Sheets

(56) References Cited

U.S. PATENT DOCUMENTS

| | | | | |
|---|---|---|---|---|
| 8,598,760 B2* | 12/2013 | Kurronen | ............... | H02K 1/276 29/598 |
| 8,716,913 B2* | 5/2014 | Kvam | ................... | H02K 1/278 310/156.49 |
| 8,901,794 B2* | 12/2014 | Siegfriedsen | ........ | H02K 1/2753 310/156.08 |
| 2008/0036215 A1* | 2/2008 | Gizaw | ...................... | H02K 1/16 290/55 |
| 2009/0289517 A1* | 11/2009 | Jockel | ................... | H02K 1/276 310/156.53 |
| 2011/0248592 A1* | 10/2011 | Siegfriedsen | ........ | H02K 1/2753 310/156.08 |
| 2011/0285216 A1* | 11/2011 | Kurronen | ............... | H02K 1/276 310/45 |
| 2012/0019088 A1* | 1/2012 | Stiesdal | ................... | H02K 1/28 310/156.12 |
| 2012/0133230 A1* | 5/2012 | Jansen | ................. | H02K 1/2766 310/156.12 |
| 2012/0187696 A1* | 7/2012 | Miyamoto | ............ | H02K 1/2746 290/55 |
| 2012/0235531 A1* | 9/2012 | Fukasaku | ............... | H02K 15/12 310/156.23 |
| 2012/0286520 A1* | 11/2012 | Booth | .................... | H02K 1/278 290/55 |
| 2015/0048701 A1* | 2/2015 | Johnsen | ................. | H02K 1/278 310/85 |

OTHER PUBLICATIONS

International Preliminary Report on Patentability dated Feb. 27, 2014 (PCT/NO2013/050059).

* cited by examiner

ROTOR INCLUDING SEGMENTED YOKE

BACKGROUND

The disclosure relates to a rotor for a motor or generator, and more specifically to a rotor including a segmented yoke, and especially for motors and generators incorporating permanent magnets.

Permanent magnet motors have become more and more popular due to their applicability. There is an increasing focus on production costs, manufacturing of mounting-friendly solutions, and the solutions should be more service-friendly, something the present solutions fail to provide. Present solutions also result in that maintenance of motors and generators is complicated and expensive.

The yoke of a rotor for a motor or generator is usually manufactured as a complete ring, something which increases the costs and complicates the manufacturing, especially related to large motors or generators. By the use of a yoke as one ring one is dependent of machining a large yoke and the number of machines capable of handling this is limited. There is thus a great need for providing solutions which simplify the manufacturing, provide improved production properties, saved costs, simpler assembling of the end-product, and improved service-friendliness.

From earlier it is know to section stator of a permanent magnet motor with the purpose of simplified production and assembling of the end-product.

From NO 331238 B1 it is known arrangement and method for protection, assembly and securing of magnetic poles consisting of permanent magnets in large electrical machines. Each pole includes one or more permanent magnet pole elements, which pole element is intended for being arranged to the rotor yoke of an electrical machine.

US 2005/0225192 A1 describes a rotor arrangement of an electrical machine which has a rotor body and permanent magnets enclosed in the rotor body.

From US 2005/0225190 A1 it is known a rotor for brushless motor and brushless motor. The invention provides a device which securely can prevent idle running and scattering of magnet while restricting manufacturing costs as low as possible, in a rotor used in a brushless motor.

US 2011/0248592 describes a rotor for an electric machine, comprising a base body and a plurality of support bodies that are fixed on the base body and support permanent magnets. The rotor is characterized in that two first support bodies that are located at a distance from one another form a receiving region for a second support body, allowing the first support body to be positively connected to the second support body. The solution suffer from complicated assembly process requiring two assembly tools and accuracy issues when assembling the first and second support bodies to each other.

SUMMARY

The disclosure provides a rotor which solves the above-mentioned disadvantages of prior art.

The disclosure also provides a rotor including a segmented yoke which can be used for a motor or generator.

Permanent magnets can be arranged to the rotor prior to or after the segments are assembled to a complete yoke.

The disclosure further provides a rotor including a segmented yoke where the segments are arranged so that a propeller blade, shafts or similar can be arranged directly to the segments.

Described herein is the construction of a rotor based on permanent magnet technology. The embodiments are especially directed to the use of a rotor with a segmented yoke where the end-product can be either a motor or generator.

The design and number of yoke segments are adapted to the desired specifications for the rotor.

With a rotor with segmented yoke the permanent magnets can be produced separately and then be arranged on the yoke segments, preferably as magnet blanks, which means that several permanent magnets are arranged to each other prior to arrangement to the yoke segment.

The number of permanent magnets in each magnet blank and on each yoke segment is adapted to the desired specifications for the rotor.

The yoke segment itself can be formed by steel, a material satisfying the electrical design or similar, or the yoke segment can e.g. be formed by laminated sheet metal of the same type sheet metal as stator for the motor or rotor is made of. One advantage with using laminated sheet material is that one then reduces the loss in the rotor, i.e. loss generated by eddy currents, and that hysteresis is reduced.

Laminated sheet material which forms a yoke segment may be arranged in radial or axial direction.

After the yoke segments are manufactured they are securely arranged on a rotor ring by means of suitable fastening means, such as bolts or similar. The rotor ring can e.g. be the propeller tube of a thruster, winch, steering engine, azimuth thruster or similar.

The magnet blanks can be arranged prior to or after the yoke segments are assembled to form a complete yoke.

A yoke of a rotor is usually made as a complete ring, which in many cases make the manufacturing and assembly of rotor complicated.

Dividing the yoke in several segments achieves a simplified manufacturing and assembly of rotor. By using a rotor which includes a complete yoke one is dependent on machinating a large yoke, i.e. a large ring, and the number of machines which can handle this is limited. By manufacturing the yoke in segments, as described herein, one achieves far higher manufacturing possibilities (capacity). The assembly of the yoke and manufacturing will be easier due to the yoke segments resulting in that one will have smaller and lighter parts to handle.

Another advantage of the described embodiments is that maintenance of a motor or generator which includes a rotor according to the disclosure is that the magnets easily can be exchanged if they are damaged.

As mentioned above, magnet blanks including permanent magnets are arranged to each segment, of which the number of North and South magnets can vary. Several permanent magnets can be glued together for forming magnet blanks prior to arrangement to the yoke segment.

The magnet blanks can be arranged to the yoke segment and corrosion-protected in different ways. One way is that the magnet blanks are arranged in a suitable encapsulation which is adapted for arrangement to the yoke segment. Another alternative is that the magnet blanks are arranged directly to the yoke segment by means of gluing, in force of the magnetic force of the permanent magnets or similar, after which the permanent magnets are encapsulated while they are arranged to the yoke segment. A third alternative is that magnet blanks already being encapsulated are glued to the yoke segment. A fourth alternative is that the magnet blanks are arranged to a carrier which is adapted for being arranged to the yoke segment and that an encapsulation is adapted to the yoke segment after arrangement of the magnet blanks. Other suitable variants can also be used.

The encapsulations can be of several types, such as a suitable material which applied to the permanent magnets prior to or after they are arranged to the yoke segment, or as a separate encapsulation of e.g. stainless steel, composite, glass fiber, elastomer or similar. For sealing of the encapsulation it can be adapted a gasket or sealing means between the encapsulation and the yoke segment or that the encapsulation is applied after arrangement.

Alternatively may both the yoke segment and the magnets can be encapsulated together in a suitable material, e.g. composite material, glass fiber, elastomer or similar.

The above-mentioned alternatives for encapsulation can also be combined.

The permanent magnets are preferably demagnetized in connection with the arrangement to the yoke segment, but can also be magnetized dependent of desired arrangement method. The yoke segment can e.g. include three magnet blanks each including four permanent magnets.

The yoke segment preferably has a design which is adapted to the complete yoke with magnet blanks forming a rotor with an accurate outer or inner circumference.

Further preferable features and advantages will appear from the following detailed description.

BRIEF DESCRIPTION OF THE DRAWINGS

The invention will below be described in detail with references to the attached drawings, where.

Figure 1:
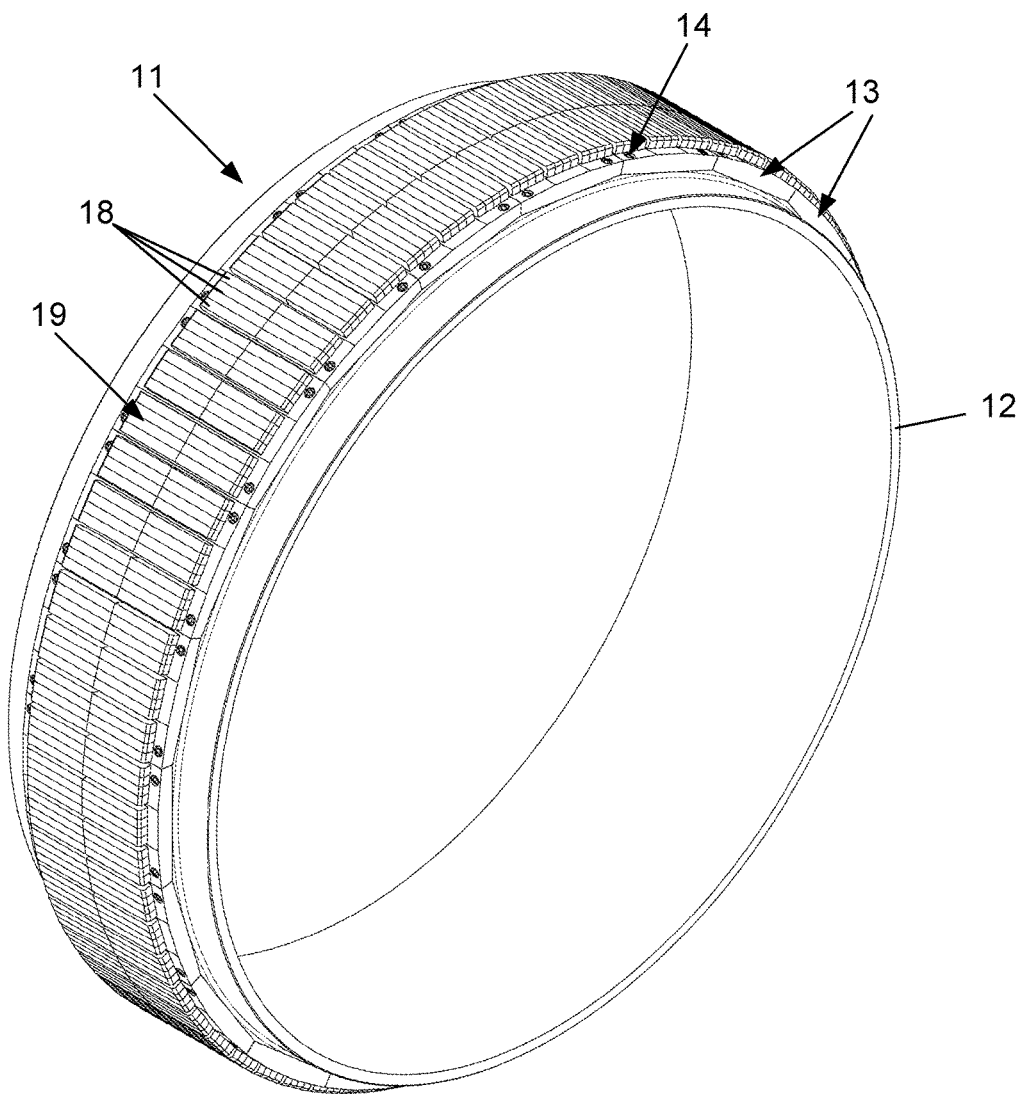
FIG. 1 is a perspective drawing of a rotor according to the disclosure.

Reference is now made to FIG. 1 which shows a rotor 11 for a motor or generator. The rotor 11 includes a rotor ring 12 with a central axis A, e.g. in the form of a propeller tube for a thruster, for which the rotor is applicable for. The rotor 11 further includes a yoke formed by yoke segments 13 which are arranged to the rotor ring 12 by means of suitable fastening means 14, such as bolts.

Figure 2A:
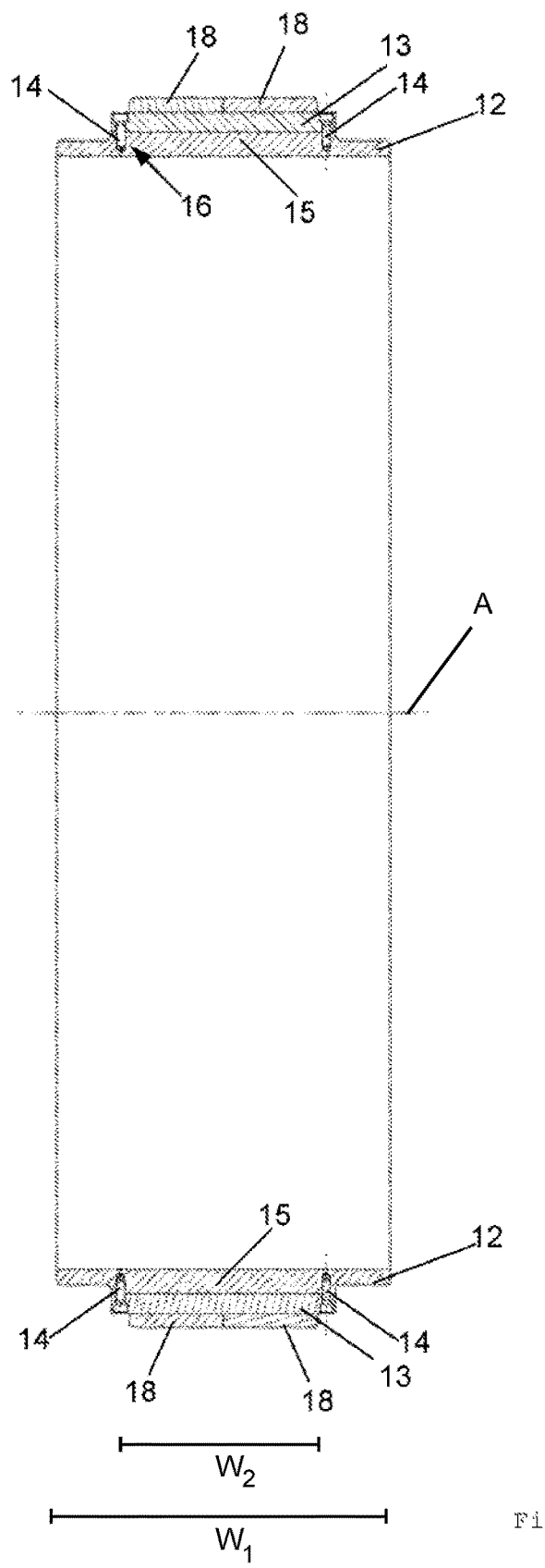
FIGS. 2a-b show different sections of the rotor in FIG. 1.
Figure 2B:
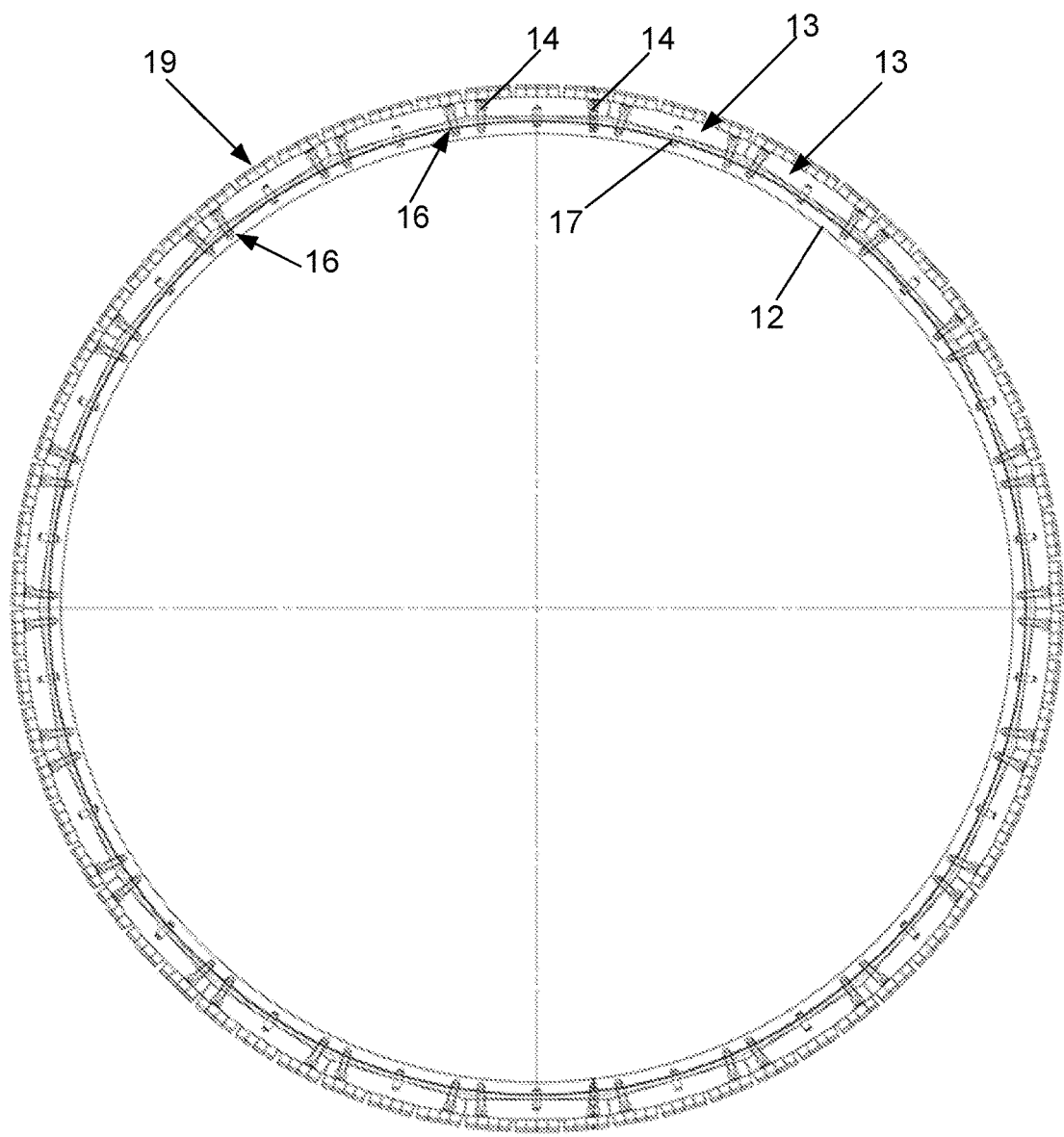

Reference is now made to FIGS. 2a-b which show two different sections of the rotor in FIG. 1. As shown in FIG. 2a, the rotor ring 12 has a width $W_1$ in the direction of the axis A and is preferably provided with a protruding part 15 which extends centrally with a given width $W_2$ less than the width $W_1$ of the rotor ring 12, and height along the entire circumference of the rotor ring 12. The width As shown in FIG. 2b, the protruding part 15 includes fastening means 16, such as threaded holes, adapted to the fastening means 14 for securing the yoke segments 13 to the rotor ring 12. Each yoke segment 13 is further provided with one or more guiding pins 17 (shown in FIG. 2b). In the example only one guiding pin is shown, and the rotor ring 12 is provided with one or more holes for a guiding pin 17, or vice versa, which guiding pin(s) 17 and hole(s) are used for positioning the yoke segments 13 in relation to the rotor ring 12 and in relation to each other.

Figure 3A:
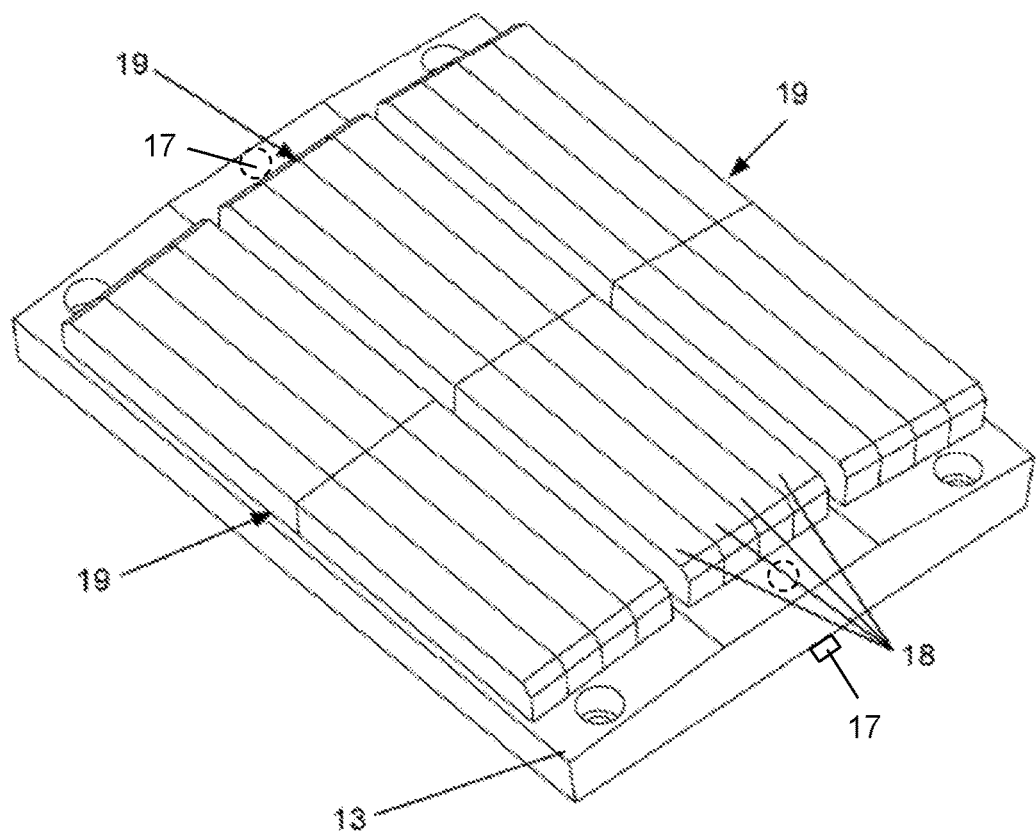
FIGS. 3a-c show details of a yoke segment.
Figure 3B:
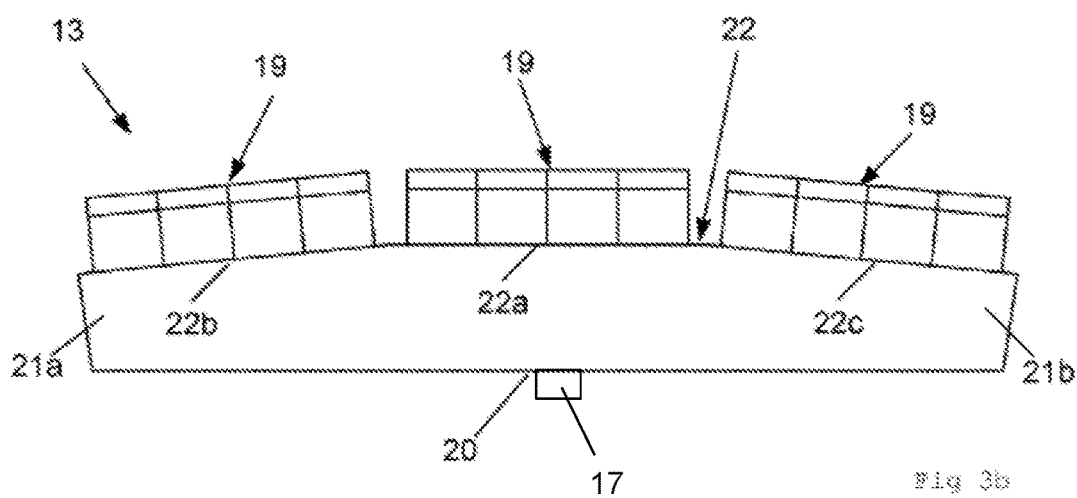
Figure 3C:
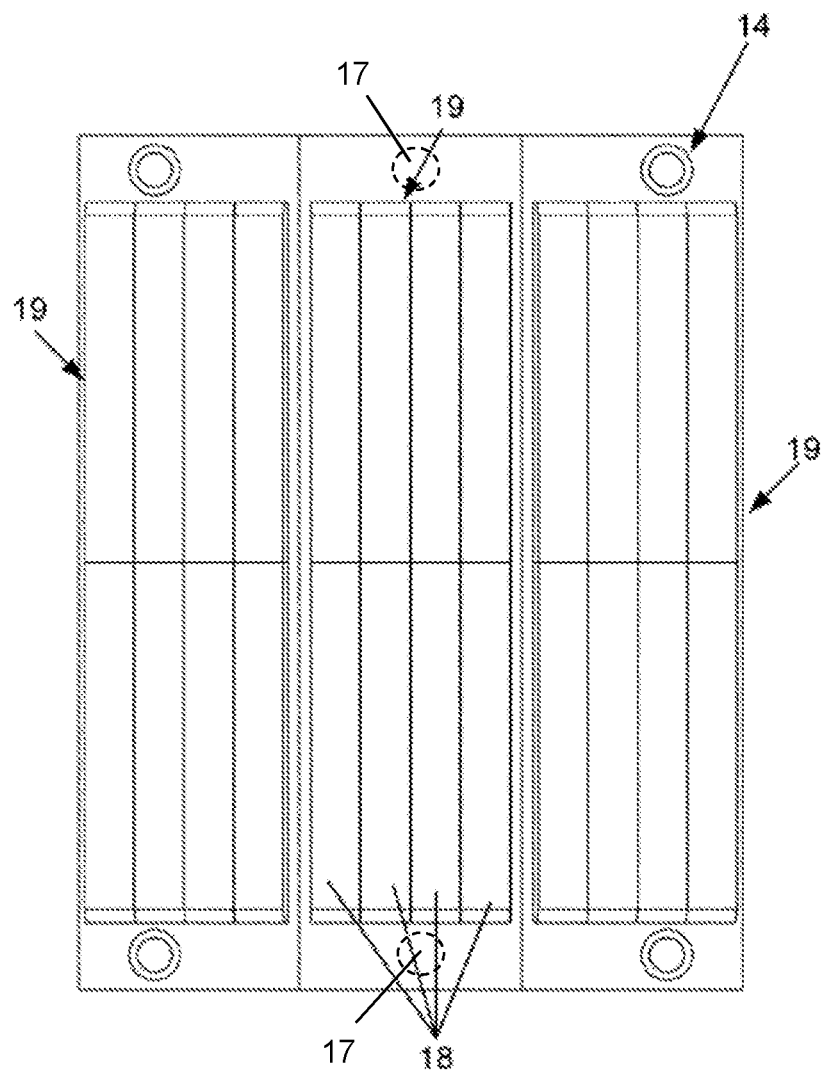
Figure 4:
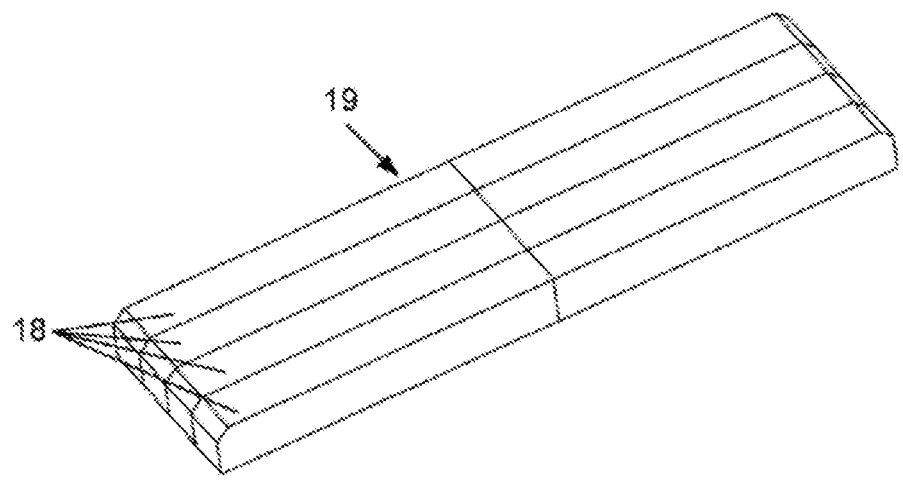
FIG. 4 shows details of permanent magnets.

Reference is now made to FIGS. 3a-c which show details of a yoke segment 13 provided with permanent magnets 18. The permanent magnets 18 are preferably arranged in magnet blanks 19, in the example three magnet blanks 19 for each yoke segment 13, where each magnet blank 19 consists of four permanent magnets 18, where the number of North and South magnets can vary, arranged in longitudinal direction of the yoke segment 13. The number of magnet blanks 19/permanent magnets 18 on each yoke segment 13 can vary and is dependent on the desired specifications for the rotor 11.

For the yoke segment 13 with magnet blanks 19 to form a complete yoke with accurate outer circumference, the yoke segments 13 has a design which is adapted so that when all the yoke segments 13 are arranged to the rotor ring 12, the end-product will have a ring with accurate outer circumference. If it is an outer rotor, the yoke segments will be arranged on the inside of the rotor ring 12 and thus form an accurate inner circumference.

After the yoke segments are assembled, i.e. provided with permanent magnets 18, the yoke segments 13 are arranged to the rotor ring 12 by means of the suitable first fastening means 14. As can be seen from FIG. 3c, the fastening means for arrangement of the yoke segments 13 to the rotor ring 12 are arranged so that they are positioned outside the permanent magnets and in this way will not reduce the effect of the permanent magnets.

The yoke segments 13 are preferably arranged with their longitudinal direction in transversal direction of the rotor ring 12, but the opposite is also a possible solution. It will also be possible to arrange the magnet blanks 19/permanent magnets 18 to the yoke segments 13 after the yoke segments 13 are assembled to form a complete yoke, i.e. arranged to the rotor ring 12.

The above-mentioned magnet blanks 19 are preferably formed by that the permanent magnets 18 are glued together. The magnet blanks 19 can be arranged to the yoke segments 13 in several ways. One way is to arrange the magnet blanks 19 directly to the yoke segments 13 by gluing, magnetic force or similar. The magnet blanks 19 are further preferably enclosed in a material protecting the permanent magnets 18 against corrosion. An alternative to this will e.g. be to arrange a suitable encapsulation to the magnet blanks 19 after the magnet blanks 19 are arranged to the yoke segment 13. The magnet blanks 19 can also be arranged in a suitable encapsulation prior to they are arranged to the yoke segment 13. Another alternative is that the magnet blanks 19 are arranged to a carrier which is adapted for being arranged to the yoke segment 13 together with one of the above described alternatives for encapsulation. Other suitable variants can also be used.

The encapsulations can be of several types, such as a suitable material which is applied on the magnet blanks 19 prior to or after they are arranged to the yoke segment 13, or as a separate encapsulation of stainless steel, composite material, glass fiber, elastomer or similar. When using a separate encapsulation it is preferably arranged a gasket or sealing means between the encapsulation and the yoke segment 13, or that the encapsulation is applied sealing means after the arrangement to make it completely sealed. Another variant can be welding of the joint between the encapsulation and the yoke segment 13. If welding is used it is an advantage that the permanent magnets 18 are demagnetized during the welding so that the permanent magnets are not damaged by the heat during this process.

It will also be possible to form the magnet blanks 19 by that the permanent magnets 18 are glued both to each other and to the yoke segment 13 at arrangement if desirable.

Figure 5:
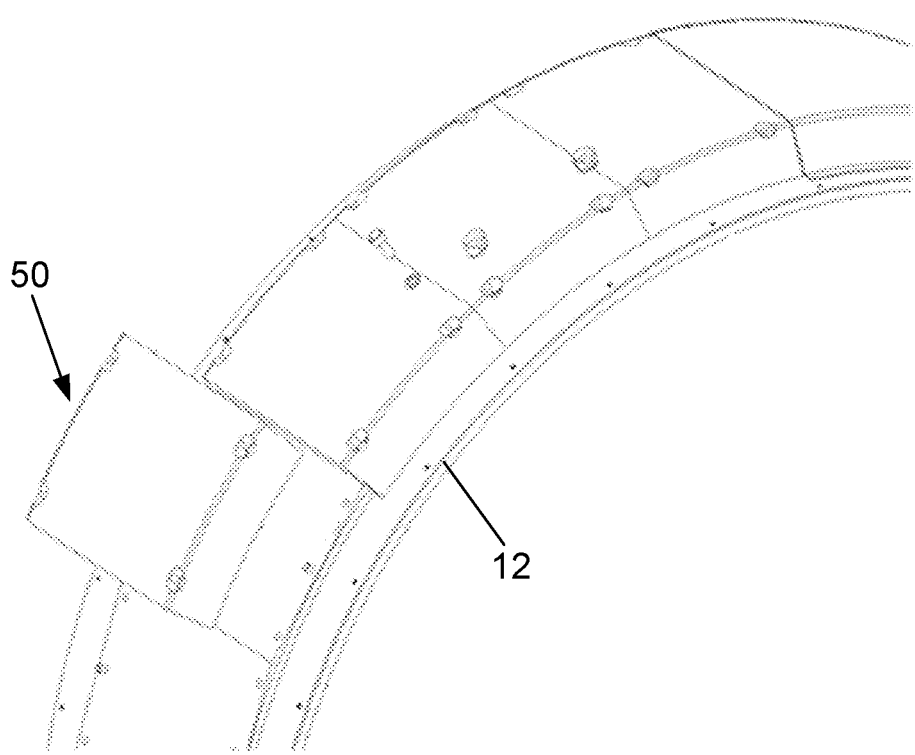
FIG. 5 shows an example of encapsulation of yoke segments.

A preferable encapsulation of the yoke segments 13 and magnet blanks 19 are shown in FIG. 5. In FIG. 5 it is shown a solution where both the yoke segment 13 and magnet blanks 19 are encapsulated in a suitable material, e.g. glass fiber, elastomer, composite or similar, such that the yoke segment 13 and magnet blanks 19 constitute an encapsulated unit 50 which is adapted for arrangement to the rotor ring 12.

The yoke segments 13 are further specially shaped so that they by arrangement to the rotor ring 12 forms a complete yoke. The yoke segments 13 are for this e.g. shaped with a mainly planar base 20 which at its ends has upwards extending sides 21a-b which extend slightly inclined outwards from the base 20 towards an upper surface 22, which has some longer extension than the base 20. The upper surface 22 has a planar central section 22a which extends in parallel with the base 20, and slightly inclined surfaces 22b-c at each side of the central section 22a inclined down towards the sides 21a-b. In this way the yoke segments 13 will be arranged close to adjacent yoke segments 13 and when the rotor ring 12 is covered by yoke segments 13 along its circumference form a complete yoke with permanent magnets 18 on the rotor ring 12 which has an accurate outer circumference for an inner rotor.

The yoke segments 13 are preferably arranged with their longitudinal direction in transversal of the rotor ring 12 and preferably have a size in the longitudinal direction which corresponds to the width of the protruding part 15 of the rotor ring 12. The yoke segments 13 further has a thickness which is adapted so that the magnet blanks 19 arranged on the yoke segments 13 form a part of the outer circumference of the rotor.

The yoke segments will thus ensure that there are similar distances between the magnet blanks after assembly.

The distance between the magnet blanks will of course be dependent of design and end-product, but the fact that there is a distance between the magnet blanks, i.e. the magnets, will make it easier to magnetize the magnets after they are arranged, as this distance will make it possible to control the magnetizing pulse correctly. In other words this distance will ensure that one does not get unwanted N-S magnet conflict in connection with magnetizing.

The accuracy in the assembly of the yoke segments to the rotor ring is ensured by correct machining according to tolerances and the use of guiding pin(s) and corresponding hole(s).

The above described embodiments have taken basis in a yoke segment of cast steel, but the yoke segment can also be formed by plates 61 of laminated steel material, i.e. the same type steel material as the stator is formed of, which are glued together and heat cured to provide a solid construction. The use of laminated sheet material will reduce the loss in the rotor, i.e. loss generated by eddy currents, and reduction of hysteresis.

Figure 6A:
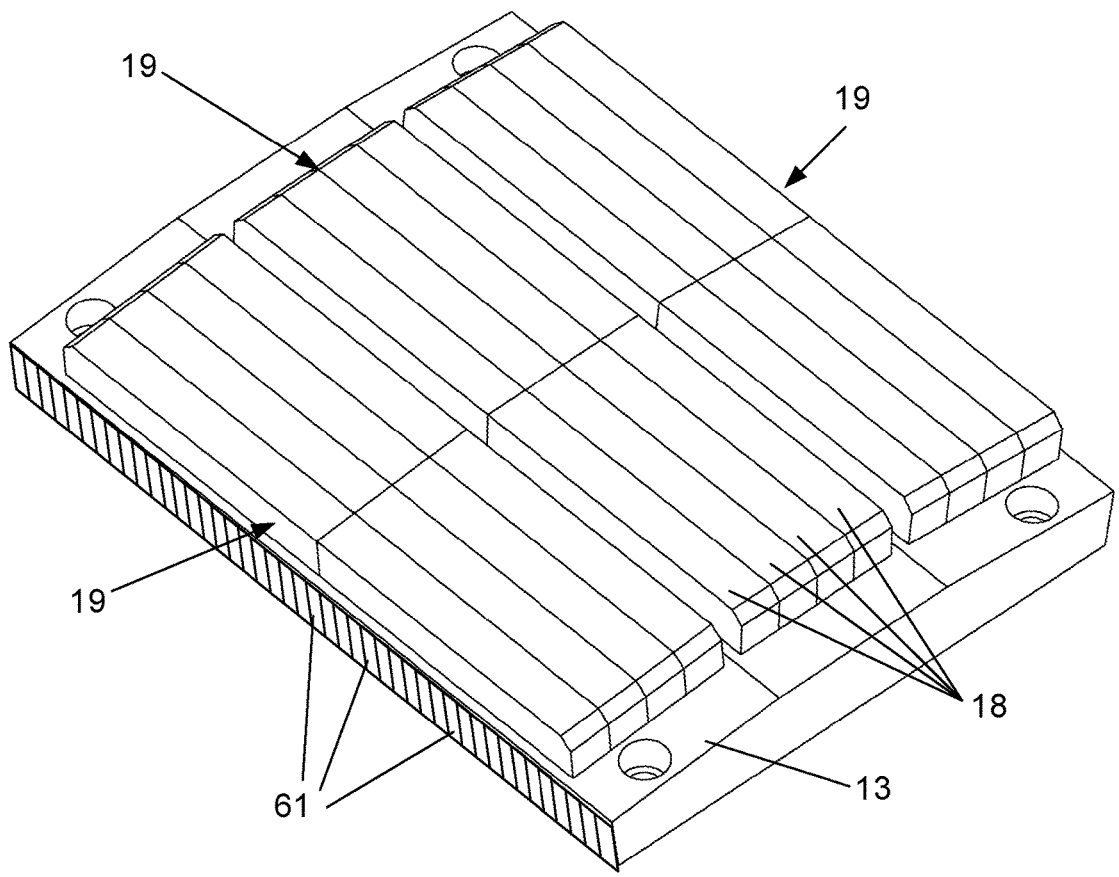
FIGS. 6a and 6b show examples of yoke segments formed by laminated sheet material.

In FIG. 6a it is shown a solution where plates 61 of laminated sheet material extend in transversal direction of the yoke segment 13.

Figure 6B:
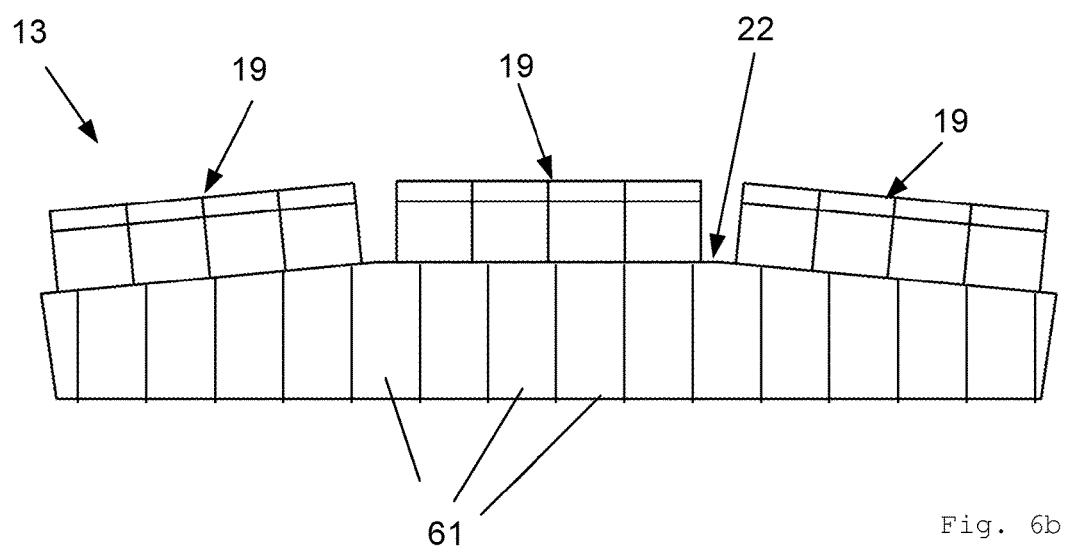

In FIG. 6b it is shown a solution where plates 61 of laminated sheet material extend in longitudinal direction of the yoke segment 13.

The rotor ring can be provided with planar or curved sections where the yoke segments are to be arranged for easier arrangement.

The yoke segments can be provided with a base which is adapted to the outer circumference of the rotor ring so that they by arrangement to the rotor ring are positioned against the rotor ring, e.g. curved so that they follow the profile of the rotor ring.

The rotor ring can also be divided in sections which are assembled to form a complete rotor ring. The segments are preferably then adapted so that they can be arranged to rotor ring segments and that the rotor ring segments with yoke segments are finally assembled to form a complete rotor for motor or generator.

The invention claimed is:

1. A rotor (11) for a motor or generator, comprising a rotor ring (12) defining a central axis A and having a radially inner portion and a radially outer portion, a yoke formed by a plurality of separate yoke segments (13) arranged adjacent to one another to the outer portion of the rotor ring (12) to form a complete yoke, the yoke segments (13) including a substantially planar base (20) having ends defining opposite side surfaces (21a, 21b) extending from the base (20) to an upper surface (22), each of the opposite side surfaces extending upwards and slightly inclined outwards from the base (20) in the direction towards an upper surface (22), the upper surface thereby having a longer extension than the base (20), wherein
   the upper surface comprises a planar central section (22a) that is substantially parallel to the base (20) between opposite inclined sections (22b, 22c) and each of the respective inclined sections (22b, 22c) is inclined from the central section (22a) downward in the direction toward the respective side surfaces (21a, 21b),
   a magnet blank (19) comprising a plurality of magnets (18) is mounted on each of the central section (22a) and opposite inclined sections (22b, 22c) with space between each magnet blank (19) such that there is space between each magnet blank (19) around the rotor ring (12), and
   the rotor ring (12) has a width $W_1$ in the direction of the central axis A and a centrally protruding section (15) that protrudes radially and has a width $W_2$ that is less than $W_1$, and
   the centrally protruding section (15) extends around the entire circumference of the rotor ring (12) with the yoke segments (13) secured to the centrally protruding section (15).

2. The rotor of claim 1, wherein the yoke segments (13) are provided with one or more magnet blanks (19) formed by one or more permanent magnets (18).

3. The rotor of claim 2, wherein the permanent magnets (18) of the magnet blanks (19) are glued together or formed by permanent magnets (18) arranged to a carrier for fastening to the yoke segments (13).

4. The rotor of claim 2, wherein the magnet blanks (19) are arranged to the yoke segments (13) via gluing or magnetic force.

5. The rotor of claim 2, wherein the permanent magnets (18) of the magnet blanks (19) are provided with corrosion protection in the form of an encapsulation of suitable material.

6. The rotor of claim 5, wherein the suitable material for encapsulation is selected from the group consisting of stainless steel, composite, elastomer and glass fiber.

7. The rotor of claim 6, wherein a gasket or sealing means is positioned between the encapsulation and yoke segments (13) after arrangement of the encapsulation and yoke segments (13) to completely seal the rotor.

8. The rotor of claim 5, wherein the encapsulation and the yoke segment (13) are welded to one another with a gasket or sealing means applied for secure sealing.

9. The rotor of claim 2, wherein the yoke segment (13) and magnet blanks (19) are encapsulated in the same material forming an encapsulated unit (50).

10. The rotor of claim 1, wherein the upper surface (22) has a mainly planar central section (22a) which extends in parallel to the base (20), and slightly inclined surfaces (22b-c) at each side of the central section (22a) that transition down towards the sides (21a-b).

11. The rotor of claim 1, wherein at least one yoke segment (13) includes at least one guiding pin (17) configured for cooperative engagement with one or more holes in the rotor ring (12) for positioning the yoke segments (13) in relation to the rotor ring (12) and in relation to the other yoke segments (13).

12. The rotor of claim 1, wherein the rotor ring (12) includes at least one guiding pin (17) configured for cooperative engagement with one or more holes in a yoke segment (13) for positioning the yoke segments (13) in relation to the rotor ring (12) and in relation to the other yoke segments (13).

13. The rotor of claim 1, wherein the rotor ring (12) and yoke segments (13) are provided with cooperative first and second fasteners (14, 16) for fastening of the yoke segments (13) to the rotor ring (12).

14. The rotor of claim 2, wherein the permanent magnets (18) are demagnetized or magnetized during the assembly.

15. The rotor of claim 1, wherein the yoke segments (13) are secured to the ring via pins (17) through the yoke segments (13) positioned outside the width $W_2$ of the protruding part (15).

16. The rotor of claim 15, wherein the pins (17) do not penetrate the rotor ring (12) past the radially inner portion.

17. The rotor of claim 1, wherein the ring (12) has a circumferential surface that extends transversally, each yoke segment (13) extends longitudinally in the transverse direction.

18. A rotor for motor or generator, comprising a rotor ring (12) defining a central axis A and having a radially inner portion and a radially outer portion, a yoke formed by yoke segments (13) arranged to the radially outer portion of the rotor ring (12) to form a complete yoke, the yoke segments (13) including a substantially planar base (20) having ends defining opposite side surfaces (21a, 21b) extending from the base (20) to an upper surface (22), each of the opposite side surfaces extending upwards and slightly inclined outwards from the base (20) in the direction towards the upper surface (22), the upper surface thereby having a longer extension than the base (20), wherein the yoke segments (13) include one or more magnet blanks (19) formed by one or more permanent magnets (18), wherein the magnet blanks (19) are arranged in an encapsulation with a gasket or sealing means between the encapsulation of the magnet blanks (19) and yoke segments (13), or wherein the magnet blanks (19) are arranged in an encapsulation, a sealing means is applied to the encapsulation of the magnet blanks (19) and completely seals the rotor, the upper surface comprises a planar central section (22a) that is substantially parallel to the base (20) between opposite inclined sections (22b, 22c) and each of the respective inclined sections (22b, 22c) is inclined from the central section (22a) downward in the direction toward the respective side surfaces (21a, 21b), a magnet blank (19) comprising a plurality of magnets (18) is mounted on each of the central section (22a) and opposite inclined sections (22b, 22c) with space between each magnet blank (19) such that there is space between each magnet blank (19) around the rotor ring (12), and the rotor ring (12) has a width $W_1$ in the direction of the central axis A and a centrally protruding section (15) that protrudes radially and has a width $W_2$ that is less than $W_1$, and the centrally protruding section (15) extends around the entire circumference of the rotor ring (12) with the yoke segments (13) secured to the centrally protruding section (15).

19. The rotor of claim 18, wherein the yoke segments (13) are secured to the ring via pins (17) through the yoke segments (13) positioned outside the width of the protruding part (15).

* * * * *